(12) United States Patent
Joshi et al.

(10) Patent No.: US 7,833,009 B2
(45) Date of Patent: Nov. 16, 2010

(54) OXIDANT INJECTION METHOD

(75) Inventors: Mahendra Ladharam Joshi, Allentown, PA (US); Michael E. Habel, Schnecksville, PA (US); Kevin Alan Lievre, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 123 days.

(21) Appl. No.: 11/216,117

(22) Filed: Sep. 1, 2005

(65) Prior Publication Data

US 2006/0057517 A1      Mar. 16, 2006

Related U.S. Application Data

(60) Provisional application No. 60/609,113, filed on Sep. 10, 2004.

(51) Int. Cl.
   *F23N 1/02* (2006.01)
(52) U.S. Cl. .............................. 431/12; 431/10; 431/8; 431/2
(58) Field of Classification Search .............. 431/2, 431/8, 10, 11, 215, 278, 12; 65/134.4; 432/179, 432/180, 181, 182, 195, 196; 110/341, 347
   See application file for complete search history.

(56) References Cited

U.S. PATENT DOCUMENTS

| | | | | |
|---|---|---|---|---|
| 3,727,562 | A | * | 4/1973 | Bauer .......................... 110/344 |
| 4,403,941 | A | * | 9/1983 | Okiura et al. ................. 431/10 |
| 5,203,859 | A | | 4/1993 | Khinkis et al. |
| 5,569,312 | A | * | 10/1996 | Quirk et al. ................. 65/134.6 |
| 5,683,238 | A | * | 11/1997 | Snyder .......................... 431/8 |
| 6,171,100 | B1 | | 1/2001 | Joshi et al. |
| 6,276,928 | B1 | * | 8/2001 | Joshi et al. ..................... 432/26 |
| 6,325,002 | B1 | * | 12/2001 | Ashworth .................... 110/345 |
| 6,325,003 | B1 | * | 12/2001 | Ashworth et al. ............ 110/345 |
| 6,699,030 | B2 | * | 3/2004 | Bool et al. ..................... 431/10 |
| 6,699,031 | B2 | * | 3/2004 | Kobayashi et al. ............ 431/10 |
| 6,702,569 | B2 | * | 3/2004 | Kobayashi et al. ............ 431/10 |
| 7,066,728 | B2 | * | 6/2006 | Chatel-Pelage et al. ........ 431/9 |
| 2002/0152770 | A1 | | 10/2002 | Becher et al. |
| 2004/0074427 | A1 | * | 4/2004 | Kobayashi et al. .......... 110/347 |

FOREIGN PATENT DOCUMENTS

| | | |
|---|---|---|
| EP | 0 643 020 A2 | 3/1995 |
| JP | 2003-20230 A | 1/2003 |

OTHER PUBLICATIONS

R. Koppang, et al., "Controlling Glass Furnace NOx with Gas Reburn", Ceramic Bulletin, Feb. 1998, pp. 51-56.
M.L. Joshi, et al., References: "Cost-Effective NOx Reduction Using Oxygen-Enriched Air Staging (OEAS) on Regenerative Glass Furnaces", Presented at 55th Conference on Glass Problems, Columbus, OH, Nov. 8-9, 1994.

* cited by examiner

*Primary Examiner*—Alfred Basichas
(74) *Attorney, Agent, or Firm*—Anne B. Kiernan (57) ABSTRACT

A method of combustion in a furnace comprising a firing zone and an exhaust zone, three oxidants and fuel comprising the steps of: introducing fuel into said firing zone; introducing a first oxidant into the firing zone; introducing a second oxidant into the firing zone; and introducing a third oxidant into the exhaust zone; wherein during said step of introducing a first oxidant, the step of introducing a second oxidant, and the step of introducing a third oxidant occur.

22 Claims, 8 Drawing Sheets

α1 and α2 = Axial divergence angles
β = Toe angle
s = slot thickness

OXIDANT INJECTION METHOD

This nonprovisional application claims the benefit of a provisional application U.S. Ser. No. 60/609113 filed on Sep. 10, 2004, incorporated herein by reference.

BACKGROUND OF THE INVENTION

Regenerative glass furnaces operate at very high process temperatures due to a high temperature air preheat level. For achieving higher thermal efficiency, the combustion air is preheated to approximately 2400° F. in ceramic regenerators before reacting with fuel inside the furnace interior. Many methods have been suggested for reducing nitrogen oxides (NOx) emissions from regenerative glass furnaces, but few have been actually implemented.

During high temperature combustion as observed in regenerative glass furnaces, NOx is formed primarily by thermal oxidation of nitrogen in combustion air—denoted as thermal NOx. Generally, thermal NOx depends on time-temperature history of the flame and increases with increasing peak flame temperatures.

The primary methods of reducing peak flame temperatures are reducing the air preheat level, and reducing the firing rate in certain locations of the furnace and using electric boost. Both approaches have limitations due to the lowering of the furnace efficiency, and production rate, and are often difficult to implement due to furnace design considerations.

Pollution control techniques usually result in added cost. Therefore, glassmakers must select the most cost-effective technique available that meets regulated emission limits in order to remain competitive. In some cases, the NOx legislation applies only to new or rebuilt furnaces, whereas, in other instances, it applies to currently operating furnaces. The most common flat glass furnaces are regenerative side-port furnaces that typically produce around 600 ton/s day glass and consume 150 MM Btu/Hr of fuel. These furnaces produce 12 to 20 lb NOx per ton of glass without any NOx abatement technology. Under the Clean Air act of 1990 in the United States, most regions of the United States limit NOx emissions to 2 to 8 lb/ton from large regenerative furnaces. Thus, most glassmakers are required to choose emission control technology for meeting their local emission targets.

There are several known technologies for NOx reduction in regenerative glass furnaces. Including fuel-rich firing, gas reburn on the exhaust side of the furnace, and oxy-fuel firing where nitrogen as the primary source of NOx is eliminated. See the following references, which are incorporated herein by reference:
1. "Controlling Glass Furnace NOx with Gas Reburn", Ceramic Bulletin, February 1998, pp 51-56 (R. Koppang, A. Marquez, D. Moyeda, M. L. Joshi, P. Mohr and R. Madrazo).
2. "References: "Cost—Effective NOx Reduction Using Oxygen—Enriched Air Staging (OEAS) on Regenerative Glass Furnaces," Presented at 55$^{th}$ Conference on Glass Problems, Columbus, Ohio, Nov. 8-9, 1994 (M. L. Joshi, D. B. Wisnick, S. K. Panahi, H. A. Abbasi, R. E. Grosman, R. F. Madrazo, W. H. Benz, A. G. Slavejkov, and L. W. Donaldson).
3. U.S. Pat. No. 5,203,859, Oxygen-enriched combustion method, Khinkis et al., Apr. 20, 1993
4. Pilkington Technology Datasheet 2, "Float Glass Technology". (http://www.pilkington.com/resources/datasheet2float.pdf)

Glass makers are looking for a cost-effective NOx reduction technology which is retrofittable to regenerative furnaces, and may provide one or more of the following benefits: lower peak flame temperatures; reasonable flame lengths due to strategic firing side oxidant injection; complete burnout of CO and combustibles; NOx emission reduction; and improved furnace efficiency due to significant combustion taking place within the melter.

BRIEF SUMMARY OF THE INVENTION

This invention provides a method of combustion in a furnace comprising a firing zone and an exhaust zone, three oxidants and fuel comprising the steps of: introducing the fuel into the firing zone; introducing a first oxidant into the firing zone; introducing a second oxidant into the firing zone; and introducing a third oxidant into the exhaust zone; wherein during said introducing a first oxidant step, the introducing a second oxidant step occurs, and the introducing a third oxidant step occurs.

DETAILED DESCRIPTION OF THE INVENTION

The term "oxidant" is used to mean air, or enriched air (which is air having a higher percentage of oxygen than in ambient air.

The term "enriched air" means a gas stream comprising greater than 21% by volume oxygen. (21% oxygen by volume is the amount of oxygen in ambient air.) It can be from any source, and includes vent stream, an oxygen-rich gas stream from a vacuum or pressure swing adsorbant apparatus (VSA or PSA), or cryogenic separation unit, or another separation mechanism, of any purity, alone or mixed with air.

The term "vent stream" means the exiting gas stream (that is not the product gas stream) from a vacuum or pressure swing adsorbant apparatus (VSA or PSA), or cryogenic separation unit, or another air separation mechanism that is primarily used to make, that is, separate a product gas, e.g. nitrogen or another gas, from air.

The term "fuel" means gaseous fuels, such as natural gas, propane, and refinery fuels (mixture of combustable gases);

liquid fuels, such as diesel, kerosene, Bunker-C, and No. 6 fuel oil; and solid fuels, such as coal, and petroleum coke.

The term "firing zone" is the volume in a furnace in which the fuel and oxidant mix and burn.

The term "exhaust zone" is the volume in a furnace in which exhaust gases and uncombusted fuel flow towards the exit for the exhaust gases and uncombusted fuel. The exit of a furnace for the exhaust gases and uncombusted fuel can be a pipe, an opening, flue, chimney, or a heat exchanger, such as a regenerator checker, or recuperator, or any combination of the above.

Figure 1:
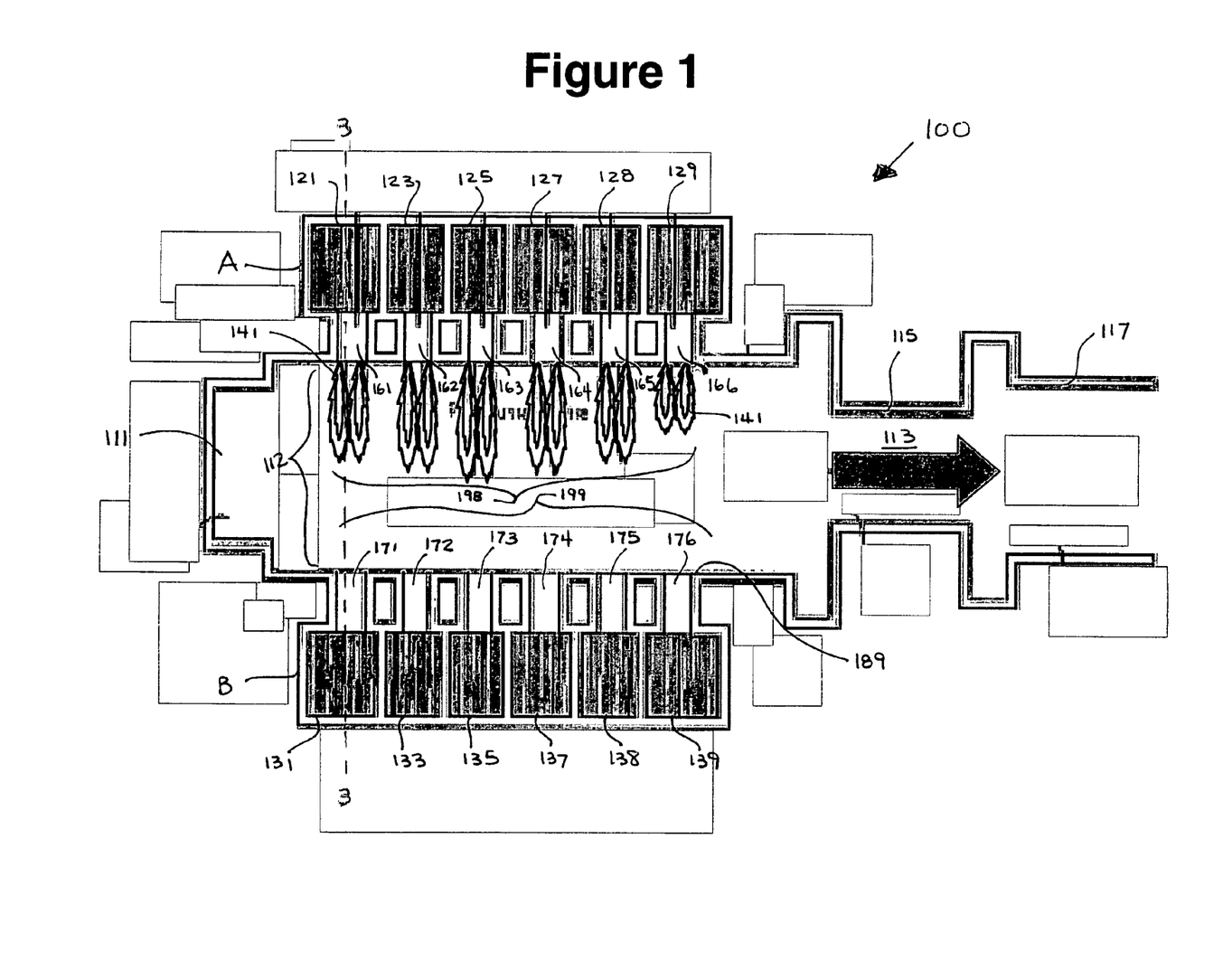
FIG. 1 shows a 6-port, side-port regenerative furnace.

The proposed invention relates to an improved oxidant injection method for NOx reduction from a furnace. One type of furnace that the method is useful for is a regenerative glass furnace as shown in FIG. 1. FIG. 1 is a top view of the furnace with the roof removed. Shown in FIG. 1 is a 6-port, side-port furnace 100 with a batch or raw material charger 111, the melter 112 with molten glass flow 113 indicated by the arrow (through a waist 115) and conditioning section 117. As shown, the regenerators in this embodiment, have individual checkers 121, 123, 125, 127, 128, and 129 on side A of the furnace and 131, 133, 135, 137, 138 and 139 on side B of the furnace. The regenerator checkers 121, 123 125, 127, 128, and 129 operate to supply oxidant for combustion, as regenerator checkers 131, 133, 135, 137, 138 and 139 act to recover heat from the exhaust gases when side A is the firing side and side B is the exhaust side as shown. The firing zone 198 is the volume over the glass in the melter 112 in which the fuel and oxidant mix and burn on firing side A. The firing zone may include a portion of the ports 161, 162, 163, 164, 165, and 166 on the firing side also. The exhaust zone 199 is the volume over the melter 112 in which absent the addition of a third oxidant on the exhaust side, no combustion typically takes place and the exhaust gases and uncombusted fuel flow toward and into the ports 171, 172, 173, 174, 175 and 176 on the exhaust side A. The exhaust zone includes the ports on the exhaust side, e.g. ports 171, 172, 173, 174, 175 and 176. The melter 112 is the volume of the furnace in which the glass is located and melted and consists of the exhaust zone 199 and the firing zone 198 minus any ports that are part of those zones, if any.

Typically, regenerative furnaces cycle roughly every 20 minutes with oxidant, typically combustion air, passing through regenerator checkers 121, 123, 125, 127, 128, 129 on side A of the furnace while the combustion air is heated by the release of heat from the regenerator checkers 121, 123, 125, 127, 128, 129, and the exhaust from the furnace exits in the regenerator checkers 131, 133, 135, 137, 138 and 139 on the opposite side, side B, of the furnace. Heat is recovered from the exhaust stream by the regenerator checkers 131, 133, 135, 137, 138 and 139 for 20 minutes. After those 20 minutes, the firing side and exhaust side of the furnace switch for the next 20 minutes, meaning that side B becomes the firing side and side A becomes the exhaust side, and then the firing side and exhaust side switch for 20 minutes, and so on.

In alternative furnaces in which the method of this invention can be used, heat may be recovered from the exhaust and supplied to the first oxidant by different heat exchangers other than regenerator checkers, e.g. recuperators. In other alternative furnaces in which the method of this invention can be used, heat will not be recovered from the exhaust stream.

As shown in FIG. 1, flames 141 are created by injecting fuel using jets or burners (not shown) into the approximately 2400° F. combustion air oxidant stream (first oxidant) exiting the firing side regenerator checkers into the furnace. The flames 141 may cover roughly two-thirds of the furnace width (the firing zone 198). The flames transfer heat to the glass in the melter 112 and other parts of the furnace interior 189 (walls, roof, etc) through radiation and then exit through exhaust ports 171, 172, 173, 174, 175, and 176 and into the individual regenerator checkers 131, 133, 135, 137, 138, and 139 on side B of the furnace 100. In the process, the regenerator checkers are heated with 2900 to 3000° F. exhaust gases. Due to high temperature combustion and relatively high residence time in the furnace, thermal NOx is produced. Typical NOx emissions from large regenerative furnaces are 12 to 20 lbs/ton of glass produced.

As explained previously, the NOx is formed primarily by thermal oxidation of nitrogen in combustion air—denoted as thermal NOx. Generally, thermal NOx depends on time-temperature history of the flame and increases with increasing peak flame temperatures.

Figure 2:
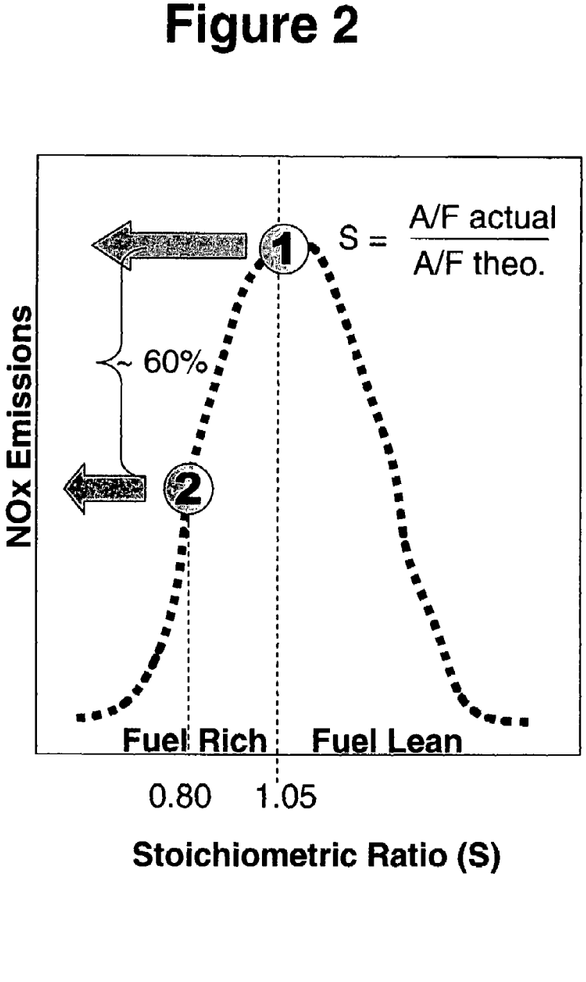
FIG. 2 shows a graph of the stoichiometry versus NOx emissions.

In order to reduce thermal NOx, the peak flame temperatures may be reduced which may be accomplished by reducing the availability of oxygen in the peak flame region. The characteristic NOx emissions based on flame stoichiometry is shown in FIG. 2. In FIG. 2, the overall furnace stoichiometric ratio (S) is plotted against NOx emissions. The stoichiometric ratio is defined as the actual Air (or other oxidant)/Fuel ratio divided by theoretically correct Air (or other oxidant)/fuel ratio. (For example for natural gas combustion, theoretically correct air/fuel ratio is approximately 10.) For any fuel, if the furnace is operating at theoretically correct amount of oxidant, the value of S=1. For the fuel-rich operation, the value of S<1 and conversely, for fuel-lean operation, the value of S>1. As shown in FIG. 2, the maximum NOx emissions are produced at slightly fuel-lean conditions (point 1). However, the NOx emissions drop at both fuel-rich and fuel-lean conditions as S moves away from point 1.

Operating the furnace at fuel-rich conditions (S<1), NOx emissions are reduced. In FIG. 2, operating the furnace at point 2 (approximately 0.8) which is fuel-rich instead of at point 1 which is fuel-lean (approximately 1.05) may provide a 60% reduction in the NOx emissions. However, for a typical furnace, the flames become extremely long depending on the level of stoichiometry. This is due to combustibles (fuel) which are unable to find necessary oxygen, and therefore the flame becomes a lazy (or lofting) luminous flame. If combustibles are not combusted within the furnace, there is a reduction in the furnace's thermal efficiency as well as an increase in CO emissions and possible non-compliance with limitations on CO emissions.

This invention provides for introducing oxidant on both the firing and exhaust sides, into both of the firing and exhaust zones, to provide a reduction in NOx emissions (a reduction in thermal NOx). NOx reduction, which may be greater than 50%, or even greater than 60% can be achieved without producing long, lazy flames. The method of this invention is a method of combustion in a furnace comprising a firing zone, an exhaust zone, three oxidant streams and fuel comprising the steps of: introducing fuel into a firing zone; introducing a first oxidant into the firing zone; introducing a second oxidant into the firing zone; and introducing a third oxidant into the exhaust zone; wherein during said step of introducing said first oxidant, the step of introducing said second oxidant and the step of introducing said third oxidant occurs.

The introducing step can be any method of getting a fuel or oxidant into the furnace, for example, by injecting, forcing, or drawing the oxidant or fuel using any introducing means, e.g. a lance, nozzle, pipe, burner, opening, valve, and the like located anywhere in the furnace. The introducing step can be through a wall, the roof, through-port, under-port, side-port or any desired location that the introducing means, e.g. a lance, nozzle, pipe, burner, opening, valve, etc. can be provided.

Forcing the oxidant or fuel under pressure can be accomplished by storing in and dispensing the oxidant or fuel from a high pressure vessel, or providing mechanical means to create the pressure, e.g. by a fan, compressor, ejector, venturi or jet pump, on the oxidant or fuel. Reference in the following description may be made to injecting oxidant via an injector or nozzle, but it is understood that any introducing step using any introducing means can be used in the method of this invention.

The first oxidant for the furnace shown in FIG. 1 may be combustion air that is introduced into the furnace via the air flow through the regenerative checkers (heat exchangers(s)) on the firing side or zone. Large fans push the first oxidant into the furnace via the regenerator checkers. However, in different embodiments, the first oxidant may be air or enriched air that is introduced into the furnace by any introduction means.

Figure 3:
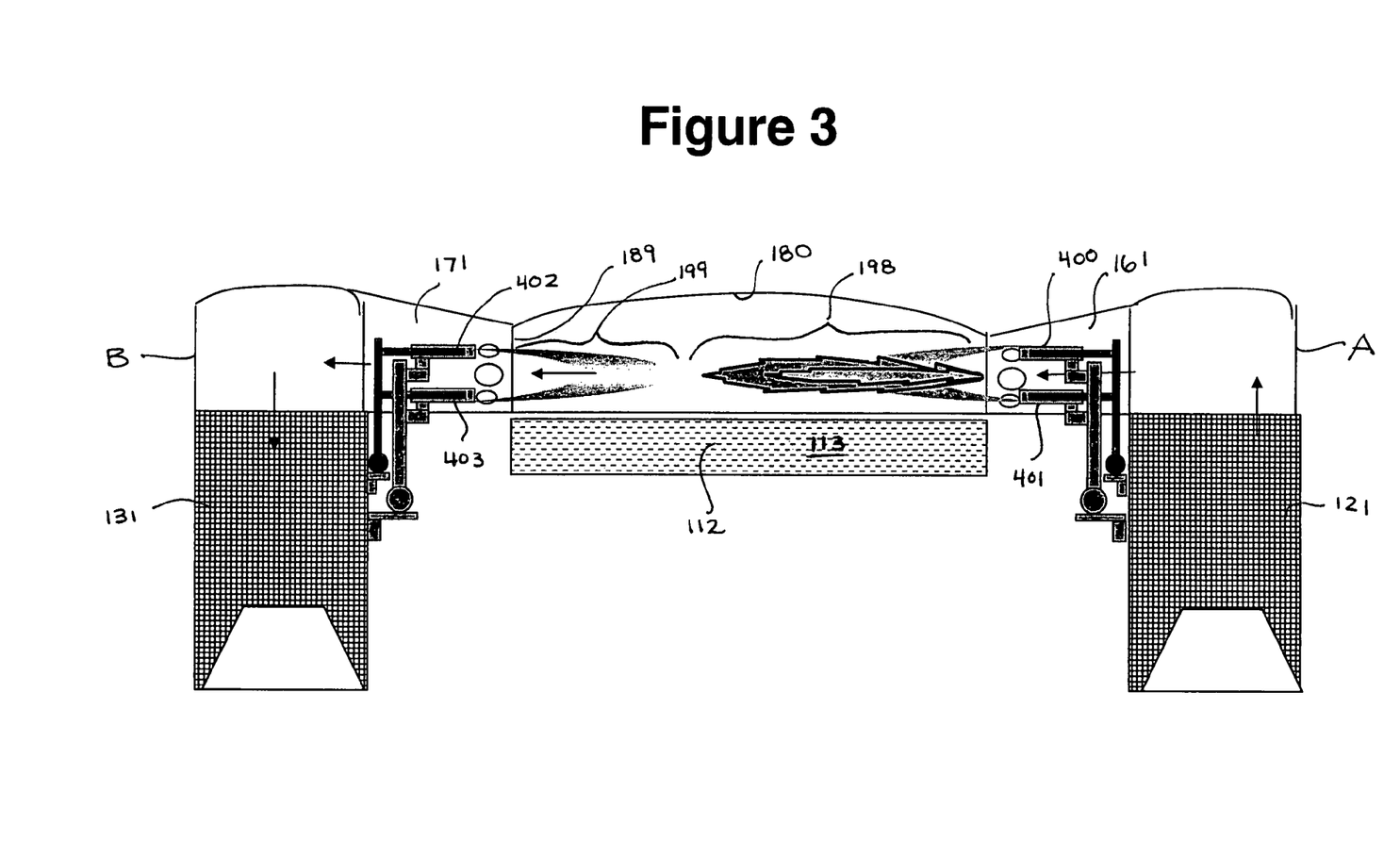
FIG. 3 shows a cross-sectional, side view of the furnace taken along the line 3-3 shown in FIG. 1 with the addition of side-port oxidant injectors on both the firing and exhaust sides.

The second oxidant in the embodiment of the furnace shown in FIG. 3 is the oxidant injected into the furnace via the injectors 400, 401 into the firing zone 198 on firing side A. The second oxidant can be air or enriched air, that can be at any temperature, that is, it may be preheated, ambient or below ambient temperature.

The third oxidant in the embodiment of the furnace shown in FIG. 3 is the oxidant injected into the furnace via the injectors 402, 403 into the exhaust zone 199 on side B. The third oxidant can be air or enriched air, that can be at any temperature, that is, it may be preheated, ambient or below ambient temperature.

In some embodiments of the method of this invention the firing zone 198 (shown on side A in FIGS. 1 and 3) has a first oxidant (combustion air) stoichiometric ratio S is less than 1; S is less than or equal to 0.9 or S is less than or equal to 0.8 producing fuel-rich operation to reduce peak flame temperatures within the firing zone. For example, the stoichiometric ratio for the first oxidant (combustion air) to fuel may be within the ranges of S is greater than 0.4 and less than 1; S is from 0.4 to 0.95; S is from 0.4 to 0.9; S is from 0.4 to 0.85; or S is from 0.4 to 0.8. This invention provides introducing a second oxidant near, at, or into the firing zone, for example, into the flames (which help to confine long and lazy flames within the melter and to help prevent the flame from overflowing into the exhaust ports. Additionally this invention provides for introducing a third oxidant into the exhaust zone, for example, the exhaust stream to burnout combustibles and CO before the exhaust exits the furnace preferably within the melter.

Each of the above process steps are described in detail with reference to FIG. 3. The firing side first oxidant (combustion air) stoichiometry S is reduced to less than 1, or 0.9 or less, or 0.8 or less. Due to the injection of the second oxidant, for example, enriched air or air on the firing side, the amount of first oxidant, for example, hot combustion air, flowing into the furnace from the checkers can be reduced, providing for fuel-rich combustion or more fuel-rich combustion without affecting heat transfer to the glass. The second oxidant stream may react with the fuel jet immediately without normal diffusion with the first oxidant. The mixing of the second oxidant and the fuel may produce soot particles in the flame which prevent flame temperature increase due to flame quenching effect. In one embodiment, the firing side injectors are located around the main burners to enable quick mixing of the injected enriched air and/or injected air (second oxidant) with fuel from the fuel jets. The number, types of and location of the firing side second oxidant injectors should be chosen to enable good mixing with the fuel from the fuel jets. The firing side second oxidant injector provides oxygen to the fuel for combustion, and although the first oxidant (e.g. combustion air), excluding the second oxidant injected, may have a stoichiometry less than 1, the flames do not become long and lazy, and the overall flame stays within the melter without overflowing into the exhaust ports. The injector configuration for firing side injection is dependent on melter burner firing configuration (underpart, side-of-port, through-port, overport, roof, etc.). The firing side and exhaust side operation is reversed based on regular furnace cycles, which can be for any period of time, for example, every 15, 20, 25, 30 minutes. Additionally, the introduction of the first oxidant, and second oxidant on the firing side and third oxidant on the exhaust side can be for the entire furnace cycle or only a portion of the cycle.

In one embodiment, in a regenerative furnace, for example, the duration of the firing side second oxidant injection is most beneficial during the portion of the furnace cycle when most of the thermal NOx is formed, which is towards the end of each furnace half cycle (during firing). When the firing side switches from one side of the furnace to the other side of the furnace, the NOx formation is relatively low at the start of each firing cycle; however, as time passes the NOx formation increases. The injection of the second oxidant (e.g. enriched air and/or air) on the firing side for the entire time that the firing side is firing, decreases the formation of the NOx. Alternatively, the injection of the second oxidant on the firing side can be limited to any portion of the firing (half cycle) on that side. For example, the second oxidant may be injected into the furnace on the firing side for three quarters or less, one half or less, or one quarter or less of the period of the furnace cycle in which the firing side is firing. The introducing step of the second oxidant for only a portion of the firing cycle may be repeated on both sides of the furnace when each side of the furnace is the firing side. It is presently believed that the injection of the second oxidant is more beneficial for the latter part of each half cycle (firing cycle), that is, for the latter portion of the time that a side of a furnace is firing; however, the times and amounts of the second oxidant injection may be adjusted to provide the lowest NOx, and control temperatures within the melter and in the regenerator checkers during any portion of the firing cycle. Alternatively, the rate of injection of the second oxidant can be increased (or decreased) from the start to the finish of a half cycle.

The enriched air which may be used as the first, second and/or third oxidant used in this invention may be from any source. An inexpensive source of enriched air is from a vent stream from an air separation unit making a different gas. In float glass plants, a source of nitrogen is needed for maintaining the tin-bath atmosphere free of oxygen. Usually, a high purity nitrogen (HPN) type nitrogen plant is used to supply needed nitrogen. The waste stream of HPN plant contains approximately 40% oxygen by volume and the rest is argon and nitrogen. The above waste stream which may be referred to as a vent stream can be used as a source of oxidant for NOx reduction. Added to the vent stream, if desired, is air. The air and vent stream can be mixed prior to, during or after injection into the furnace on the firing side. One source of air for supplying to the injectors and mixing with the vent stream is fan air, that is, air at elevated pressure, e.g. at 2 to 5 psig, via a fan.

For two embodiments several process parameters have been defined in the table below. The sources of oxidants on the firing side can be either or both enriched air and air introduced into the furnace via nozzles (or injectors) or combustion air from the checkers or other openings on the firing side. In Table I, the stoichiometry ratios have been calculated for the firing side.

TABLE I

Range of firing side parameters for an example furnace

| Firing Side Parameter | Value Range |
|---|---|
| Desired overall firing side stoichiometry ratio (S) for NOx reduction | 0.70 to 0.90 |
| Combustion air stoichiometric ratio ($S_{air}$) (Theoretically correct air flow rate means $S_{air}$ = 1) | 0.60 to 0.80 |
| Firing side injector O2 stoichiometry ratio | 0.02 to 0.30 |
| Firing side injector air stoichiometry ratio | 0.02 to 0.30 |
| Injector flow oxygen concentration (air = 0.21) | 0.21 to 1.00 |
| Firing side/exhaust side injector oxidant flow ratio | 0.05 to 0.50 |

Note that in Table I, and Table III, the Firing side/exhaust side injector oxidant flow ratio is the ratio of second oxidant/third oxidant.

As shown in Table I, for one embodiment of the invention, the combustion air (first oxidant) stoichiometry is reduced to fuel-rich operation, say 0.7. At this point, the firing side enriched air and/or air injector (second oxidant) is turned on, and the overall stoichiometric ratio of the firing side reaches 0.8. In other words, the injection of firing side enriched air and/or air (second oxidant) would raise the overall firing side stoichiometry from 0.7 (as implemented by combustion air only) to 0.8. Thus, contribution of the firing side injectors is 0.1 to the overall stoichiometric ratio. However, the range of contribution by the injected enriched air and/or air (second oxidant) to the stoichiometric ratio can be larger or smaller, e.g. 0.02 to 0.3, as shown in Table 1 or for other embodiments 0.05 to 0.75, or from 0.05 to 0.5, or from 0.1 to 0.3 depending on the furnace design and level of fuel-rich operation needed on the firing side for NOx reduction. Table I also indicates that the concentration of oxygen in the enriched air and/or air injected (second oxidant) into the furnace on the firing side can be in the range of 0.21 to 1. Although not indicated in Table I, in the method of this invention, the enrichment level can alternatively be in the range of 0.25 to 0.9, or 0.3 to 0.8. An enrichment level of 1.00 means pure oxygen at 99.999% purity is injected as the enriched air on the firing side.

In Table II, additional embodiments (examples) of the invention are defined for a single port of a typical float glass furnace (production rate at 600 tons/day and firing heat rate of 150 MM Btu/Hr). It is assumed that the port is firing at 30 MM Btu/Hr firing rate using 1000 Btu/scf natural gas (NG) fuel. The typical flow rates of combustion air (first oxidant) and injected enriched air and/or injected air (second oxidant) are indicated for NOx reduction (estimated to be about 60%) as measured in the exhaust port.

TABLE II

Example flow rates of firing side operation

| Flow Parameters for 30 MM Btu/Hr firing rate | Typical Values |
|---|---|
| NG fuel flow rate (mscfh) (LHV of NG = 1000 Btu/scf) | 30,000 |
| Desired overall firing side stoichiometry ratio (S) for NOx reduction | 0.80 |
| Combustion air stoichiometric ratio ($S_{air}$) (Theoretically correct air means $S_{air}$ = 1) | 0.70 |
| Combustion air flow (scfh) | 210,000 |
| Firing side injector O2 flow rate (scfh) if 99.9% purity O2 is used | 3,150 |
| Firing side injector flow rate (scfh) if 40% purity Ventstream oxidant is used | 7,875 |
| Firing side injector air flow rate (scfh) | 15,000 |
| Firing side injector oxidant enrichment level (air = 0.21) | 0.35 |

For the embodiments shown in Table II, for maintaining firing side stoichiometry of 0.8 (using combustion air at S=0.7 level), the firing side enriched air and air injector(s) would inject 3,150 scfh of high purity oxygen and 15,000 scfh of fan air (which together are the second oxidant). Alternatively, if 40% oxygen purity vent stream is used, the enriched air injector flow would be 7,875 scfh of the vent stream and 15,000 scfh of fan air (which together are the second oxidant). For either of those resulting enriched air and air injector (second oxidant) flows, the oxygen level is 0.35. Either embodiment will enable low peak flame temperature operation for yielding lower NOx emissions but at the same time it will confine the flame within the melter. The air and enriched air (second oxidant) can be mixed before, during or after injection into the furnace, and may be injected via a single injector or separate injectors for the enriched air and air streams.

For some embodiments of the invention, the third oxidant is injected at a higher flow rate than the second oxidant. The third oxidant may be injected at several locations in the exhaust zone depending on the furnace configuration. To reduce the amount of required equipment, it may be preferred that the same means for introducing the second oxidant (enriched air and/or air) into the firing zone for half the furnace cycle is used for introducing the third oxidant for the second half of the cycle into the exhaust zone when that same furnace side is the exhaust side; however, that is not required and two discrete introducing means, e.g. sets of nozzles or injectors, may be provided if desired to optimize the NOx reduction. A first set of one or more nozzles may be used for the second oxidant injection into the firing zone and a second set of one or more nozzles would be provided for the third (exhaust side) oxidant injection into the exhaust zone. The exhaust zone oxidant injection nozzles could differ in size, design, location, and orientation from the nozzles used for oxidant injection into the firing zone. The direction of oxidant injection for the firing and exhaust side nozzles can be co-current or counter-current or at an angle to the direction of combustion air and exhaust streams. The angle of co-current, counter-current or other oxidant injection stream(s) can be optimized based upon furnace specifics such as furnace size, port geometry, firing rates, and other operational considerations.

The details of certain embodiments of the injectors will be described below. The term "exhaust side (exhaust zone) injected oxidant" or "exhaust side (exhaust zone) oxidant" is used as compared to "firing side (firing zone) injected enriched air or air" just to make the distinction about which part of the cycle is being described; however, the exhaust side oxidant may be an enriched air and/or air of the same or similar composition as the firing side injected enriched air and/or air. The term "exhaust side (exhaust zone) injected oxidant" or "exhaust side (exhaust zone) oxidant" is the third oxidant. The "firing side (firing zone) injected enriched air or air" is the second oxidant. The third oxidant is injected into the exhaust zone, whereas the first and second oxidants are injected into the firing zone.

The third or exhaust side oxidant injection rates may be greater than, less than, or equivalent to the firing side injected second oxidant flow rate; however, in some embodiments an exhaust side oxidant injection rate 2 to 20 times larger than corresponding firing side second oxidant flow rate may be useful. The objectives of the third oxidant injection is to complete combustion of unburned fuel, CO and other hydrocarbons. Due to the fuel-rich combustion of the firing side, CO is leftover in the burner flames which may be from for example 1 to 10% by volume of total flame gases on wet basis. The CO is combusted using the third oxidant introduced into the exhaust zone. The means of introducing the third oxidant, the number and location of those means, e.g. of injectors are selected to enable thorough mixing with the exhaust stream to complete the combustion process within the melter and preferably not in the exhaust ports or regenerator checkers. The flow rates of the third oxidant and enrichment level (that is, the percentage of oxygen within the third oxidant) is calculated based on firing side and overall furnace stoichiometry. In one example of an embodiment of this invention, the stoichiometry for the furnace could be calculated as shown in Table III.

TABLE III

Stoichiometry parameters for example furnace

| Exhaust Side Parameter | Value Range |
|---|---|
| Desired overall firing side stoichiometry ratio (S) for NOx reduction | 0.70 to 0.90 |
| Combustion air stoichiometric ratio ($S_{air}$) (Theoretically correct air flow rate means $S_{air} = 1$) | 0.60 to 0.80 |
| Exhaust side injector O2 stoichiometry ratio | 0.00 to 0.35 |
| Exhaust side injector air stoichiometry ratio | 0.15 to 0.35 |
| Injector flow oxygen concentration (air = 0.21) | 0.21 to 1.00 |
| Firing side/exhaust side injector oxidant flow ratio | 0.05 to 0.50 |

For purposes of the calculations for the embodiment shown in Table III, the stoichiometric ratio for the exhaust side enriched air indicated as "O2" in Table II, was within the range of from 0 to 0.35. 0 represents the injection of no enriched air (in which case only air is injected on the exhaust side as the third oxidant). 0.35 may be the preferred maximum contribution to the stoichiometric ratio by the exhaust side oxidant injection that is provided by the exhaust side injected enriched air or the exhaust side injected air or the combination of the exhaust side injected air and enriched air (third oxidant). In the case of one embodiment of a hybrid (air-fuel and oxy-fuel combined) furnace, the exhaust side oxidant stoichiometric ratio maximum limit may be as high as 0.6. Table III, however, reflects one embodiment in which air is always injected into the exhaust zone as part of or all of the third oxidant, that is, there is a minimum contribution of exhaust side injected air to the stoichiometric ratio of 0.15. The sources for the enriched air and the air for introduction into the exhaust zone can be the same or different as those described above for the firing zone.

Using the same furnace described above for Table II, the flow rates for the third oxidant into the exhaust zone for one embodiment of the invention were calculated, and are shown in Table IV.

TABLE IV

Example of Exhaust side flows for Example Furnace

| Flow Parameters for 30 MM Btu/Hr firing rate on firing side | Typical Values |
|---|---|
| Desired overall furnace stoichiometry ratio (S) | 1.10 |
| Desired firing side stoichiometry ratio (S) for NOx reduction | 0.80 |
| Combustion air stoichiometric ratio ($S_{air}$) | 0.70 |
| Firing side injector stoichiometric ratio | 0.1 |
| Exhaust side injector stoichiometric ratio | 0.30 |
| Exhaust side injector O2 flow rate (scfh) if 99.9% purity O2 is used | 9,450 |
| Exhaust side injector flow rate (scfh) if 40% purity Ventstream oxidant is used | 23,625 |
| Exhaust side injector air flow rate (scfh) | 45,000 |
| Exhaust side injector oxidant enrichment level (air = 0.21) | 0.35 |

As shown in Table IV, the overall firing zone stoichiometry is 0.8, therefore the furnace needs 9,450 scfh of high purity oxygen and 45,000 scfh of fan air for injection as the third oxidant to achieve the desired overall furnace stoichiometry of 1.10. If a vent stream with 40% oxygen purity is used instead, 23,625 scfh of vent stream flow and the same amount of fan air can be used as the third oxidant. The third oxidant comprising the high purity oxygen or the vent stream will have 35% oxygen content. The above flow values are for illustration only and they are very much dependent on furnace design, burner configuration and injector configuration. As would be expected if more or less enriched air (high purity or vent stream) is available the amount of air injected in the third oxidant would be adjusted.

The duration of the exhaust zone injection is beneficial during the entire exhaust cycle or a portion of the exhaust cycle of the furnace cycle, for example, when most of the thermal NOx is formed, which is towards the end of each furnace half cycle (exhaust cycle). In a regenerative furnace, when the firing side switches from side A of the furnace to side B of the furnace, NOx formation is relatively low initially; however, as time passes, NOx formation increases. The injection of the third oxidant into the exhaust zone, e.g. side A, decreases the formation of the NOx for the entire time that Side B is firing, but if preferred, the exhaust side injection can be for only a portion of the cycle. For example, the oxidant on the exhaust side may be injected into the furnace for three quarters or less, one half or less, or one quarter or less of the exhaust cycle. It is presently believed that oxidant injection is more beneficial for the latter part of each exhaust cycle, that is, for the latter portion of the time that the exhaust side of a furnace is not firing; however, the times and amounts of oxidant injection on the exhaust side may be adjusted to provide the lowest NOx, control temperatures within the melter and in the regenerator checkers during any portion of the firing. Alternatively, the amount of third oxidant injected during the exhaust cycle can increase (or decrease) during the exhaust cycle. The time and amounts of the first, second and third oxidant injection may be determined experimentally for a given furnace.

However in the furnace embodiment in which the overall firing zone stoichiometric ratio is below 1, it is preferred that the third oxidant is injected into the exhaust zone during firing which may be continuously to provide the needed oxygen for complete combustion of the fuel in the melter.

Figure 5:
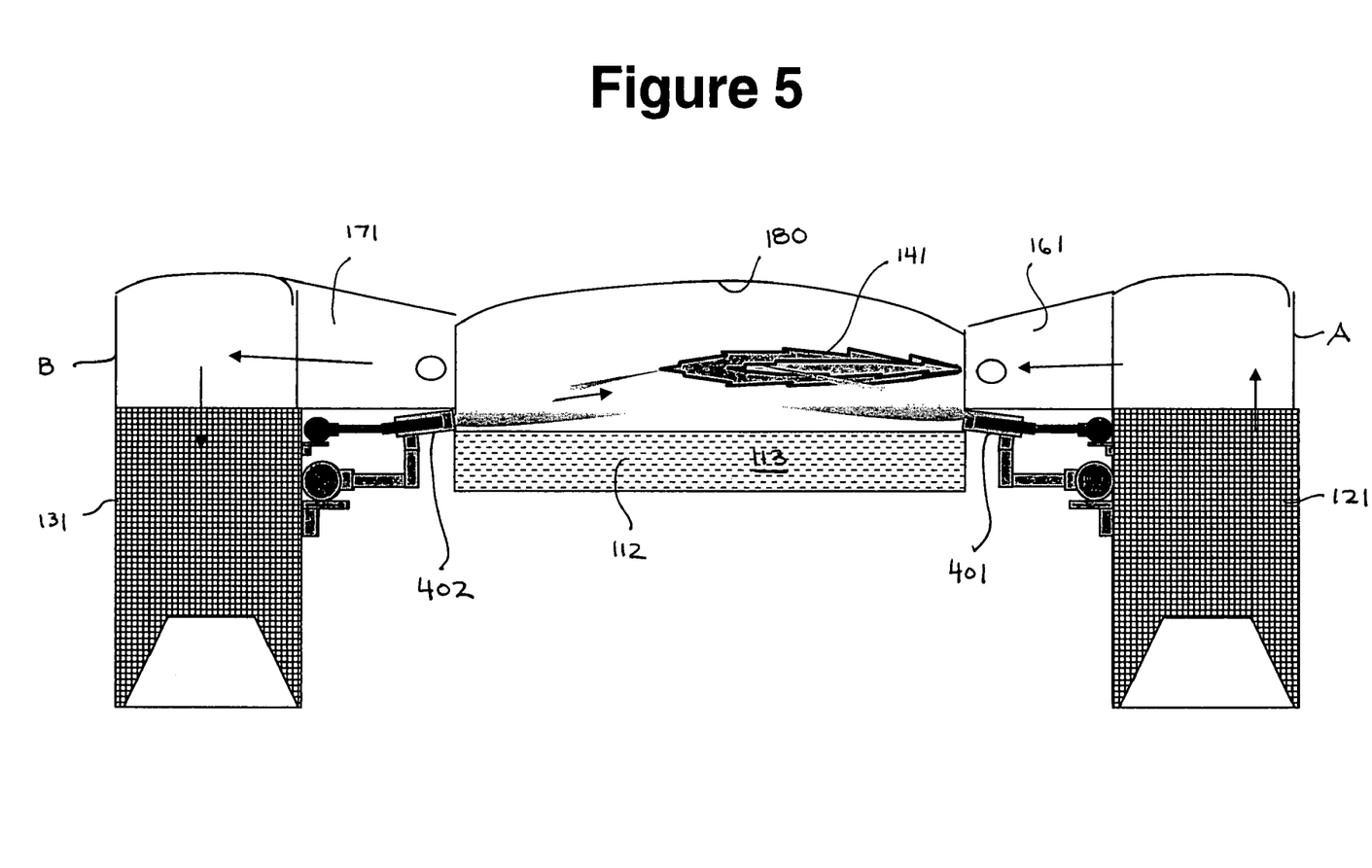
FIG. 5 is the same as FIG. 3 except it shows an alternative embodiment of the method of this invention comprising under-port oxidant injectors on both the firing and exhaust sides.
Figure 6:
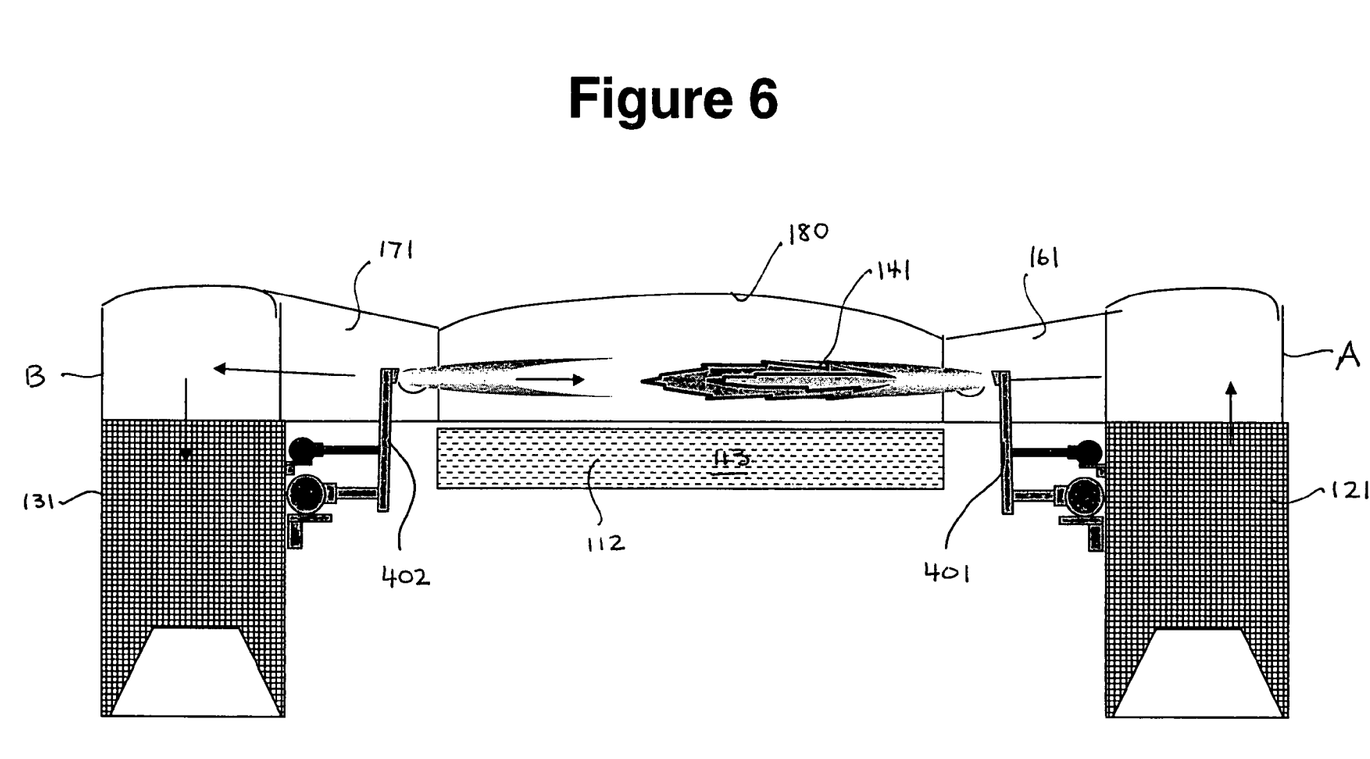
FIG. 6 is the same as FIG. 5 except it shows an alternative embodiment of the method of this invention comprising through-port oxidant injectors on both the firing and exhaust sides.

The oxidants can be introduced into the furnace by injectors or nozzles. The injectors or nozzles for the firing side and exhaust side can be any injectors or nozzles of any design useful for that purpose. The location of the firing zone and exhaust zone injectors can be anywhere as long as the oxidant(s) are injected into and provide for good mixing with either fuel stream in the firing zone or exhaust gases in the exhaust zone, respectively. For example the injectors 400 can be located side-of-port as shown in FIG. 3, under-port as shown in FIG. 5, through-port as shown in FIG. 6, over-port (not shown), on or through the roof (not shown) with the location dependant upon the furnace and burner configurations, safety, and accessibility.

Figure 4:
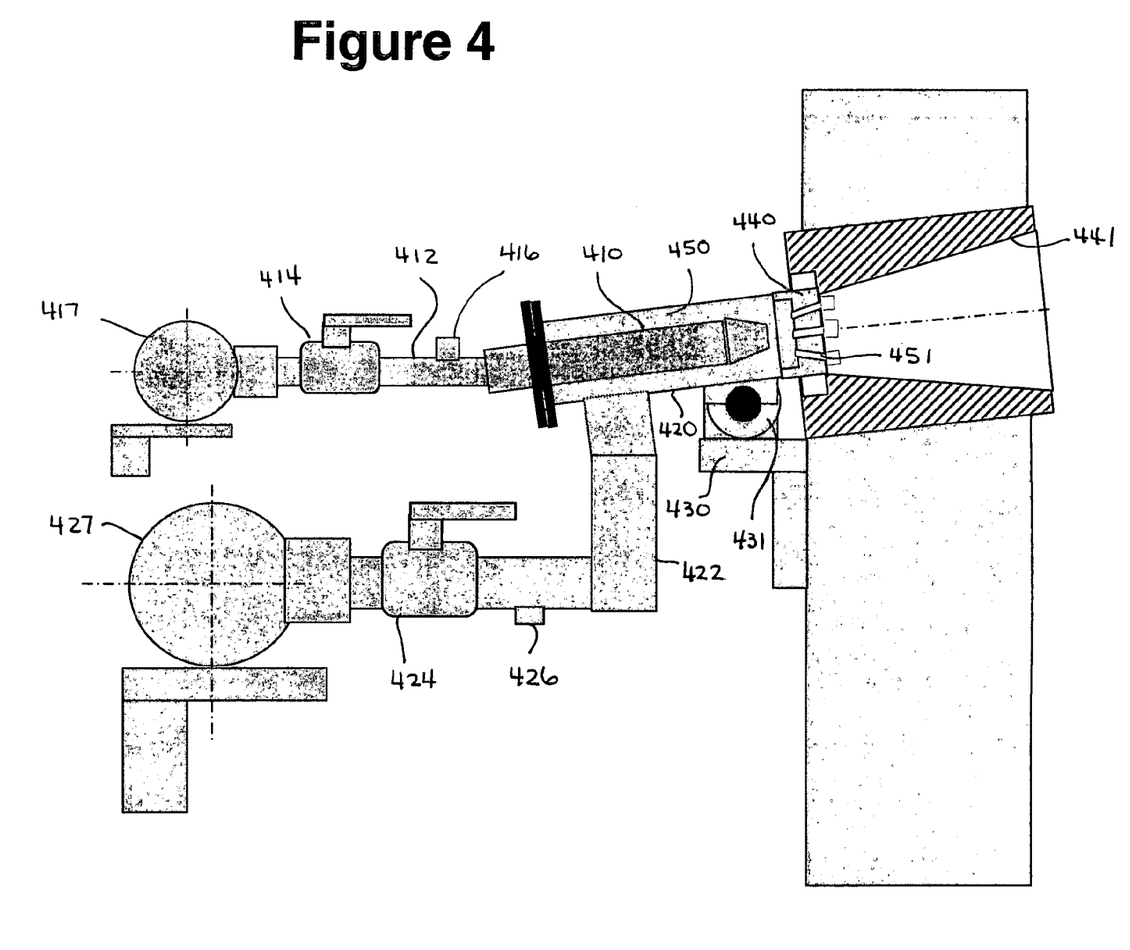
FIG. 4 shows one embodiment of an under-port oxidant injector and a portion of the supply piping to the injector that could be used in the method of this invention.

Another aspect of the proposed invention is a new injector 400 shown in FIG. 4, which may be used in the method of this invention or in other methods of operating a furnace that are in the prior art. The injector 400 is suited for the injection of either air alone, enriched air (industrial oxygen or vent stream) alone or air and enriched air simultaneously. In order to maintain individual flows and pressure independence of the air and enriched air, the air and enriched air are transported separately in separate piping or manifolds and then mixed inside a pipe-in-pipe (concentric pipe) injector 400. Alternatively the inner and outer pipe could transport streams of the same composition at different pressures that may be simultaneously or alternately introduced into the furnace. In one embodiment of the nozzle shown in FIG. 4 the inner pipe 410 is used for enriched air, whereas the annular space 450 formed by the inner and the outer pipe 420 is used for supplying fan air; however, this configuration can be reversed if desired to locate the enriched air in the annular space and air in the inner pipe or any other combination of 2 oxidants, for example, 2 enriched air streams having different compositions and/or flow rates. The fan or compressed air should have sufficient pressure, for example 2 to 5 psig, for achieving necessary injection velocities. The schematic of the injector shown in FIG. 4 is useful for under-port oxidant injection and may be used for both the firing side and exhaust side, and can accommodate a change in composition and/or flow rate of the oxidant in one or both pipes during the furnace cycle. For example, as one side of a furnace switches from the firing side to the exhaust side, the flow rate of the air may increase by 2 to 6 times and the enriched air may be shut off.

The injector 400 shown in FIG. 4 is shown in an under-port configuration. The injector 400 has two separate connections or piping 412, 422 for two separate gas streams. In one example of the embodiment shown, the injector has enriched air (e.g. industrial oxygen having an oxygen content greater than air) connections 412 and fan air connections 422; however, any combination of oxidant gas streams could be used in the injector 400. The respective flows of enriched air and fan air can be biased using biasing valves 414, 424, respectively. In addition, the injector can be aimed at different angles using a suitable mounting bracket 430 with tilt capabilities 431. For protection against furnace radiation, the nozzle tip 440 is recessed back in a refractory block 441, similar to burners (not shown) in the furnace. Each pipe 412, 422 is provided with pressure tap 416, 426, respectively to indicate supply pressure as an indication of oxidant flow rate. The flows can be easily calculated based on upstream pressure and exit nozzle sizing. In order to create a good mix of oxidant from each pipe 412, 422 without significant pressure drop, the higher pressure oxidant, for example enriched air, may flow in the center pipe 410 and the lower pressure oxidant, for example air, flows in the annular space 450. This way, due to venturi effect, a well-defined enriched oxidant mixture can be injected into the furnace. The nozzle tip 440 with multiple orifices 451, for example holes or slots, will be explained below. The piping 412, 422 also consists of headers 417, 427, respectively.

The oxidant injector location for various burner firing configurations may differ. For example, see the side-of-port burner firing configuration shown in FIG. 3. In FIG. 3, two injectors, above and below the side-of-port firing burner are installed. The injectors are aimed at an angle to the first oxidant (combustion air) stream. The injectors may be angled the same as the burners near which the injectors are installed. Based on typical burners which are aimed at a 10° angle to the combustion air stream, the second oxidant injectors may be angled 10 to 30° to the combustion air (first oxidant) stream. This angle is described as a toe angle in the injector nozzle discussion below. Alternatively, any toe angle can be used in the method of this invention or for example a toe angle between from 0 to 45°.

For oxidant injection around a burner (not shown), it is important that burner design is taken into account. Fuel injection velocities and the angles in orifices in the nozzle tip and the toe angle of the burner should be considered when calculating oxidant injector velocities and the aiming angle of the introduction means (for example, the injector). In the firing zone, the oxidant injector stream could directly engage the fuel jet and thermally crack the fuel stream into soot particles. In the exhaust zone, the oxidant injectors should engage the exhaust stream with the widest possible capture angle or divergence to enable quick CO burnout within the melter. Use of multiple introducing means (injectors) with a carefully determined design toe angle should allow efficient mixing with the exhaust gases. In FIGS. 5 and 6, under-port and through-port configurations of oxidant injectors are illustrated.

For under-port oxidant injectors as shown in FIG. 5, the toe angle is aimed upward or towards the furnace crown 180. This way, the oxidant stream can engage either fuel on the firing side or the exhaust stream in the exhaust zone. For through-port oxidant injectors as shown in FIG. 6, it is required that the injectors are adequately cooled, for example, water-cooled, to prevent metal oxidation in the high temperature environment of the exhaust ports. The injectors are also angled slightly downwards at the nozzle tip using a nozzle toe angle to prevent creation of hot-spots on the crown.

In the just-described injectors having two oxidants flowing therethrough, each oxidant stream may be regulated and controlled using a standard flow skid. High oxygen content oxidants (for example, vent stream or industrial oxygen) may be regulated and controlled using a standard flow skid. The flow skid requires safety (double block and bleed) and flow control valves for regulating flows with the firing rate. If fan air is one of the oxidants to be injected into the furnace, the fan air can be supplied by a high pressure fan mounted on a flow control skid. A variable frequency drive (VFD) can be used to control fan speed and oxidant flow rate. For increased reliability, a backup fan may be supplied.

Another aspect of the oxidant injector to provide for efficient mixing (in addition to the pipe-in-pipe design and the injector angle) is the design of the nozzle tip 440. The nozzle orifices are sized based on oxidant flow rates and available pressure. For good mixing, injection oxidant velocities in the range of 100 to 1000 feet/sec are necessary. If the same nozzles are used for both the firing side and the exhaust side, the flow rates may differ significantly on the firing side versus the exhaust side. For example, the exhaust side may have a flow rate 5 times larger than the firing side; therefore, the velocities on the exhaust side may be 5 times larger than the firing side.

Figure 7:
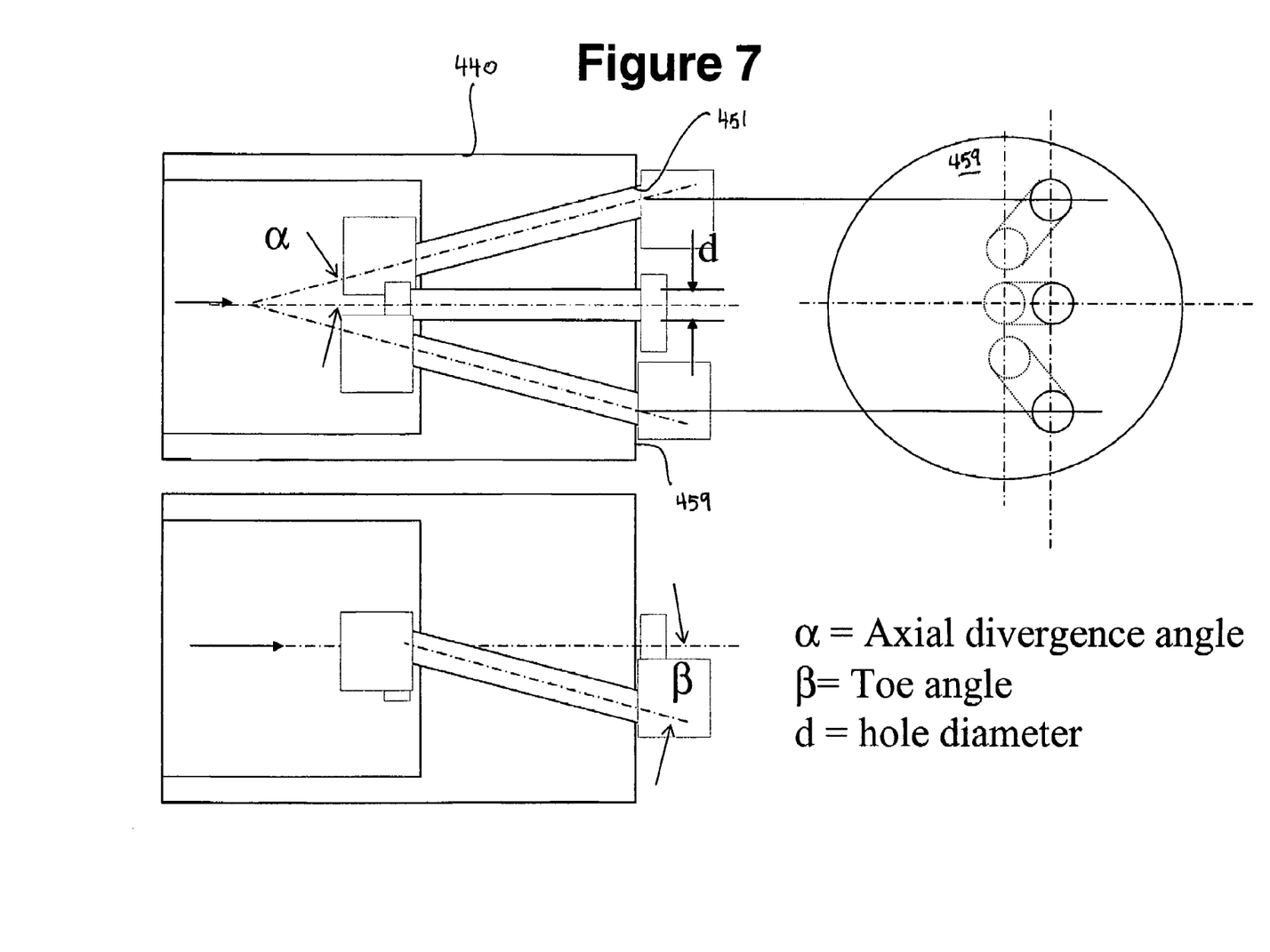
FIG. 7 shows cross-sectional plan and elevational views and an end-view of an injection nozzle tip that may be used in the method of this invention.

FIG. 7 shows a cross-sectional view and a front view of a multiple-hole nozzle tip 440 and the face 459 which is part of the oxidant injector 400 shown in FIG. 4. The nozzle has orifices 451, in this case holes drilled at compound angles. As shown, the angle α is the axial divergence angle. This angle helps to distribute oxidant by axially divergence. α can vary range from 0 to 30°. The optimum value for α is about 15°. The toe angle β can range from 0° and 15°. The optimum value for β is about 7°. The toe angle is important to bend oxidant streams toward the burner fuel jet on the firing side or towards the flue gas stream on the exhaust side of the furnace.

Figure 8:
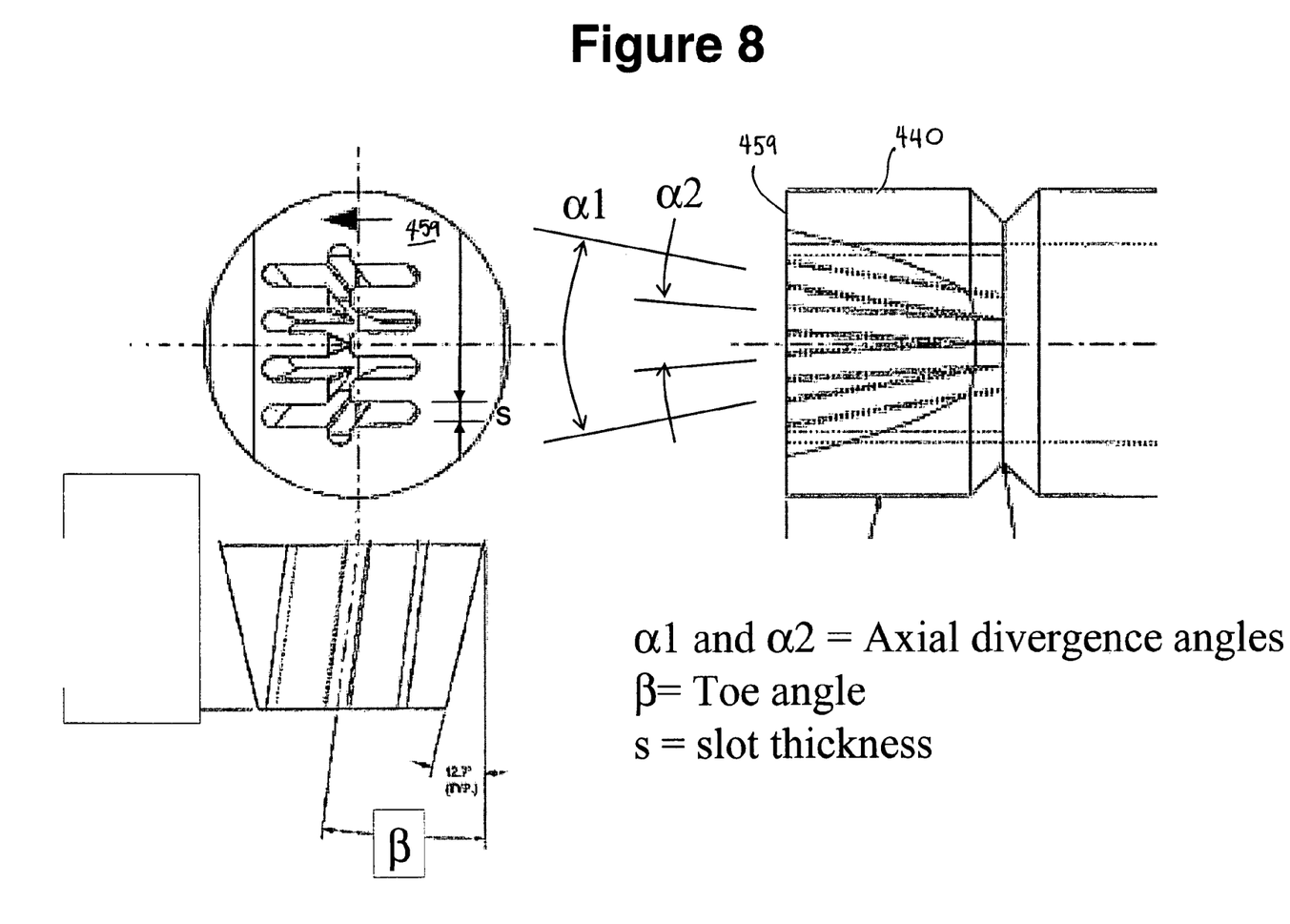
FIG. 8 shows a cross-sectional plan and elevational views and an end-view of an alternate injection nozzle tip that may be used in the method of this invention.

FIG. 8 shows a multi-slot oxidant injector design. Here, angles α1 and α2 are axial divergence angles whereas angle β is the toe angle. Due to a wide aspect ratio slot design, the entrainment efficiency of this nozzle is better than the multi-hole nozzle shown in FIG. 7. The zipper shaped nozzle is capable of mixing oxidant streams in 3 times shorter axial distances than similar flow area nozzles of circular hole geometry. One preferred hole geometry is disclosed in U.S. Pat. No. 6,866,503; incorporated herein by reference.

The method of this invention can be used in an oxy-fuel furnace (not shown) in which the first oxidant is an enriched air stream that is introduced into the firing zone, through the burner, and a second oxidant is introduced into the firing zone through the burner, or adjacent to the burner, or in any of the other locations described earlier for where the secondary oxidant may be introduced on the firing side. The expression "through the burner" means that the oxidant is introduced above, below, on the side of, or around the fuel through connections that are part of or attached to the burner. The first oxidant and/or second oxidant in this embodiment may exit the burner through separate exits, although they may enter the burner through a single feed line or pipe to the burner. One example of a burner that can be used in the method of this invention to introduce a first and second oxidant into the firing zone may be referred to in the prior art as an oxy-fuel burner with staging, commercially available from Air Products and Chemicals, Inc. as the Cleanfire® HR™. An oxy-fuel burner with staging has two separate exits for the first and secondary oxidants, although the composition of the first and second oxidants may be the same and may be introduced into the burner via a single source. Examples of burners having two separate exits for the first and second oxidants include those disclosed in Air Products' U.S. Pat. Nos. 5,611,682, and 7,390,189 incorporated by reference herein. The third oxidant will be introduced into the furnace as described above for the other embodiments of the method of this invention. In the method of the invention in which the first and secondary oxidants are introduced into the furnace zone via the burner, the first and second oxidants are preferably enriched air streams having an oxygen composition of greater than 90%, or greater than 93% by volume.

This invention has been described with reference to a glass furnace; however, it is equally applicable to other types of high temperature industrial furnaces used for melting ferrous, or non-ferrous metals. The method may be used in glass furnaces used to melt float glass or other types of flat glass, container glass, fiber glass, or other glass types classified as specialty glasses (CRT/TV glass, tableware, lighting, etc.) These furnaces include unit melters, recuperative melters, sideport regenerative melters, endport regenerative melters, hybrid air-fuel/oxy-fuel melters, and "full conversion" complete oxy-fuel fired melters. For furnaces of different configurations, the firing zone and exhaust zone may not be located on opposite sides of the furnace as shown in the Figures herein, but will be located where the fuel jets are located (firing zone) and where the exhaust gases flow toward an exhaust exit (exhaust zone).

In hybrid furnaces for melting glass, such as disclosed in U.S. Pat. No. 6,519,973 incorporated herein by reference, the majority of the combustion energy over the melt section of the furnace is provided by oxy-fuel combustion while a majority of the combustion energy over the fining section of the furnace is provided by air-fuel combustion. A hybrid furnace has a section where only oxy-fuel burners are used over the melt section of the melter and another section where air-fuel burners are used over the fining section of the melter. The present method of invention would be applicable to hybrid furnaces where advantages of oxy-fuel and airfuel combustion are utilized. The combustion air stoichimetry ratio S may be set in the range of $0.2<S<1$ to enable fuel-rich combustion on the firing side of the air-fuel burners. A secondary oxidant is injected on the firing side of the air-fuel burners to reduce the overall flame length. On the exhaust side, the third oxidant may be injected with the exhaust side stoichiometry of 0.05 to 0.75, for example, for the complete burnout of CO and unburned fuel inside the furnace. The use of oxy-fuel and air-fuel combustion with proposed oxidant injection would enable high thermal efficiency, improved glass quality as well as lower NOx emissions.

Most embodiments of the invention will fall within one or more of the stoichiometric ratios defined herein. The stoichiometric ratio for the first oxidant may be within the range of from 0.2 to 1.1, or from 0.4 to 0.9, or from 0.6 to 0.8. The stoichiometric ratio for the second oxidant may be within the range of from 0.05 to 0.75, or from 0.05 to 0.5, or from 0.1 to 0.3. The overall stoichiometric ratio on the firing zone may be from 0.45 to 1.15, or from 0.5 to 1.1, or from 0.7 to 0.95. The stoichiometric ratio for the third oxidant on the exhaust side may be from 0.05 to 0.75, or from 0.1 to 0.6, or from 0.2 to 0.4. The overall stoichiometric ratio for the furnace (firing and exhaust zones) may be within the range of from 0.9 to 1.3, or from 0.9 to 1.1, or from 0.95 to 1.05. Methods with any combination of the above listed S ranges are part of this invention. These S values are all calculated based on the rates of introduction of the fuel, and first, second, and third oxidants into the furnace.

Although this invention has been described with particular attention to particular embodiments, the application of the method of this invention to additional embodiments would be obvious to one of ordinary skill in the art, and therefore the invention includes obvious variants of the embodiments falling within the claims.

The invention claimed is:

1. A method of combustion in a glass furnace comprising a melter, side A and side B, and regenerators on side A and side B of the furnace; said method comprising the steps of:
  locating a firing zone on one of side A and side B and an exhaust zone on the other of side A and side B of the furnace;
  introducing fuel into the firing zone;
  introducing a first oxidant into the firing zone;
  introducing a second oxidant into the firing zone, said first oxidant is air and said second oxidant comprises enriched air,
  combusting said fuel and said first and second oxidants in said firing zone to transfer heat to the melter;
  flowing exhaust gases toward the exhaust zone for a time;
  introducing a third oxidant into the exhaust zone to complete combustion of unburned fuel within the melter;
  wherein during said step of introducing a first oxidant, the step of introducing a second oxidant, and the step of introducing a third oxidant occur;
  switching the sides of the furnace that are the firing zone and the exhaust zone; and
  repeating said method.

2. The method of claim 1, wherein for at least some portion of said introducing of said first oxidant step, both said introducing a second oxidant step and said introducing a third oxidant step occur.

3. The method of claim 1, wherein said first oxidant comprises air from said regenerators and provides a stoichiometric ratio between 0.2 and 1.1 in said firing zone.

4. The method of claim 3, wherein said second oxidant provides a stoichiometric ratio of between 0.05 and 0.5 in said firing zone.

5. The method of claim 3, wherein said first and second oxidants combined provide a stoichiometric ratio of from 0.45 to 1.15 in said firing zone.

6. The method of claim 3, wherein said third oxidant provides a stoichiometric ratio of from 0.05 to 0.75 in said exhaust zone.

7. The method of claim 3, wherein said first, second and third oxidants provide an overall stoichiometric ratio of from 0.9 to 1.3 in said firing and exhaust zones.

8. The method of claim 1, wherein said first oxidant provides a stoichiometric ratio of less than 1 in said firing zone.

9. The method of claim 1, wherein said first oxidant provides a stoichiometric ratio of less than or equal to 0.9 in said firing zone.

10. The method of claim 1, wherein said first oxidant provides a stoichiometric ratio of less than or equal to 0.8 in said firing zone.

11. The method of claim 1, wherein said second oxidant provides a stoichiometric ratio between 0.05 and 0.5 in said firing zone.

12. The method of claim 1, wherein said first and second oxidants combined provide a stoichiometric ratio of from 0.7 to 0.95 in said firing zone.

13. The method of claim 1, wherein said third oxidant provides a stoichiometric ratio of from 0.05 to 0.75 in said exhaust zone.

14. The method of claim 1, wherein said first, second and third oxidants provide a stoichiometric ratio of from 0.9 to 1.3 in said firing and exhaust zones.

15. The method of claim 1, wherein said first oxidant provides a stoichiometric ratio of from 0.4 to 0.9 in said firing zone, and said second oxidant provides a stoichiometric ratio of from 0.1 to 0.3 in said firing zone.

16. The method of claim 15, wherein said third oxidant provides a stoichiometric ratio of from 0.1 to 0.6 in said exhaust zone.

17. The method of claim 16, wherein said first oxidant, second oxidant and said third oxidant provide an overall stoichiometric ratio of from 0.9 to 1.1 in said firing zone and said exhaust zone.

18. The method of claim 1, wherein said first oxidant, said second oxidant and said third oxidant are independently selected from the group consisting of air, heated air, fan air, enriched air, and vent stream.

19. The method of claim 1 wherein said furnace is selected from the group consisting of a regenerative melters, unit melters, recuperative melters, hybrid air-fuel/oxy-fuel melters, and oxy-fuel fired melters.

20. The method of claim 1, wherein said step of introducing said second oxidant into the firing zone is done by injecting said second oxidant via one or more injection nozzles and wherein said step of introducing said third oxidant into the exhaust zone is done by injecting said third oxidant via one or more injection nozzles, and said second oxidant comprises vent stream.

21. The method of claim 1, further wherein said step of introducing a third oxidant occurs for three quarters or less of the time of said step of flowing exhaust gases toward the exhaust zone prior to said switching step.

22. The method of claim 21, further wherein said step of introducing a third oxidant occurs for the latter three quarters or less of the time of said step of flowing exhaust gases toward the exhaust zone prior to said switching step.

* * * * *